United States Patent [19]
Sullivan et al.

[11] 3,760,048
[45] Sept. 18, 1973

[54] BRIQUETTING AND CALCINING CRUSHED MINE RUN WESTERN PHOSPHATE SHALE ORE

[75] Inventors: James K. Sullivan; Richard I. Howard, both of Pocatello, Idaho

[73] Assignee: FMC Corporation, New York, N.Y.

[22] Filed: Apr. 22, 1970

[21] Appl. No.: 30,688

Related U.S. Application Data

[63] Continuation-in-part of Ser. No. 871,647, Oct. 17, 1969, abandoned, which is a continuation of Ser. No. 708,580, Feb. 27, 1968, abandoned.

[52] U.S. Cl. .................... 264/56, 23/313, 264/63, 264/125
[51] Int. Cl. ..................... C22b 1/20, C22b 1/14
[58] Field of Search ................. 264/63, 56, 125; 23/313

[56] References Cited
UNITED STATES PATENTS

| | | | |
|---|---|---|---|
| 2,776,828 | 1/1957 | Marcellus et al. | 23/313 |
| 3,076,248 | 2/1963 | Darrow et al. | 264/56 |

OTHER PUBLICATIONS

K. R. Komarek, "Selecting Binders and Lubricants for Agglomeration Processes," Dec. 4, 1967, CHEMICAL ENGINEERING, at pages 154–155

Carl Ludwig, "How and Why Solids Agglomerate," CHEMICAL ENGINEERING, January, 1954, at 156–160

*Primary Examiner*—John H. Miller
*Attorney*—Frank Ianno, Eugene O. Seems and Pauline Newman

[57] ABSTRACT

A strong, calcined phosphate agglomerate useful as a phosphorous furnace feed is produced by crushing mine run western phosphate shale ore to substantially -½ inch, agglomerating the crushed shale with sufficient water to produce phosphate agglomerates having a moisture content of between about 9 to about 12% (preferably 10 to 11.5%), placing the phosphate agglomerates on a non-agitated, perforate carrier to form a feed bed, passing the feed bed on the non-agitated, perforate carrier through a calcining zone, calcining the feed bed for at least about 15 minutes at a temperature in the range of 2,000 to 2,500°F, cooling the feed bed, and recovering calcined agglomerates.

5 Claims, 3 Drawing Figures

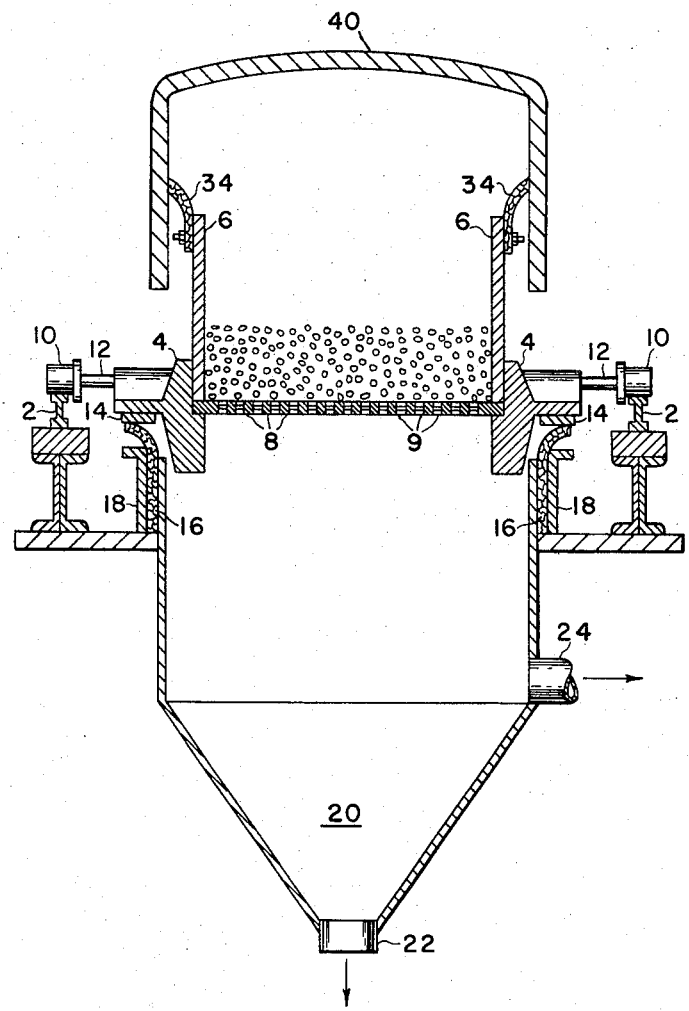

BRIQUETTING AND CALCINING CRUSHED MINE RUN WESTERN PHOSPHATE SHALE ORE

CROSS-REFERENCE TO RELATED APPLICATIONS

This application is a continuation-In-Part of application number 871,647, filed October 17, 1969 and now abandoned, which, in turn, is a Continuation of application number 708,580, filed February 27, 1968 and now abandoned, all in the names of James K. Sullivan and Richard I. Howard.

BACKGROUND OF THE INVENTION

A. Field of the Invention

The invention relates to a process for producing calcined phosphate agglomerates which are especially suitable for furnace feed in the manufacture of phosphorus.

B. Description of the Prior Art

The phosphate ores obtainable in the western part of the United States are composed of large deposits of phosphate shale containing up to about 32% $P_2O_5$ in the form of calcium phosphate. These ores also contain silica, iron oxide, organic matter, clay, small quantities of chromium oxide and vanadium oxide, and from 2 to 4% shale oil. These ores are converted to phosphorus by reduction with carbon (coke) in an electric furnace. Calcined phosphate agglomerates, derived from phosphate shale and suitable for furnace feed, have been produced by crushing the above-described shale in a hammer mill into particulate form to pass a 4-inch screen. The crushed shale is then further screened into fine and coarse fractions with a 14 mm screen, and the fine fraction is agglomerated by either briquetting or pelletizing; the agglomerated fraction and previously separated coarse fraction are then calcined together in a rotary kiln.

The operation of the rotary kiln in the above process gives rise to serious difficulties. One of these is the relatively low mechanical strength of the calcined phosphate product which disintegrates into fines and which must be screened out at the termination of the calcination process. These screened fines are returned to the briquetting step and mixed with the crushed shale to form additional briquettes. However, due to the low mechanical strength of the calcined phosphate, additional fines are formed after screening; these unscreened fines enter the phosphate furnace along with the calcined phosphate nodules and cause erratic furnace operation.

An improved process for producing calcined phosphate agglomerates without the need for a rotary kiln is set forth in U. S. Pat. No. 3,076,248, issued on Feb. 5, 1963, to Wendell L. Darrow et al. In this process shale is crushed into a fines fraction and a coarse lump fraction, and the fines fraction is agglomerated; the coarse lump fraction is placed on a non-agitated, perforate carrier as an underhearth layer, while the agglomerated fines are placed over the underhearth layer to form an overlay layer of agglomerated particles. The resulting bed is then calcined on the non-agitated, perforate carrier to yield acceptable, calcined agglomerates.

While the above process has been found commercially feasible and most advantageous over the rotary kiln process, it requires the use of two separate feed layers, one being the coarse lump fraction (the underhearth layer), and an overlay of agglomerated fines. These feed layers do not have equal amounts of phosphorous values, nor are the phosphorous values equally distributed throughout the layers. As a result, the calcined product does not have uniform distribution of its phosphorous values. Thus, when the calcined product is fed to an electric furnace, the non-uniform distribution of phosphorous values in the furnace burden makes operations somewhat more difficult because it diminishes contact of the phosphate particles with carbon in the furnace.

Another difficulty which is encountered with the above patented process is that the briquettes prior to calcination, termed "green briquettes", are subject to breaking and powdering during the normal handling, especially when these briquettes are unloaded onto the perforate carrier. The ruptured briquettes and fines must then be recycled to the briquetting machine to re-form them, placing an increased load on the briquetting equipment.

OBJECTS OF THE INVENTION

It is an object of the present invention to produce green phosphate briquettes which have high strengths and which do not fracture or crumble during normal handling.

It is a further object to produce calcined phosphate agglomerates suitable for furnace feeds, having high strengths and in which the phosphorous contents of the briquettes is uniform.

It is a further object to produce calcined phosphate agglomerates having high strengths on a non-agitated, perforate carrier by a process which obviates the need for an underhearth layer of non-agglomerated shale.

These and other objects will be apparent from the following description of the invention.

SUMMARY OF THE INVENTION

It has now been determined that calcined phosphate agglomerates having high tumbling strengths and suitable as a furnace feed in the production of phosphorus can be produced by crushing phosphate shale so that at least 90 percent is no larger than one-half inch (preferably so that at least about 95 percent is no larger than one-half inch with at least 80 percent being no larger than 1/4 inch), briquetting or pelletizing the crushed shale in a wet agglomeration step so that the agglomerates have a moisture content of about 9 to about 12 percent (preferably about 10 to 11.5 percent), placing the agglomerates on a non-agitated, perforate carrier to form a bed, and calcining the resulting bed for at least about 15 minutes at a temperature of about 2,000 to 2,500°F.

BRIEF DESCRIPTION OF THE DRAWINGS

In the drawings:

FIG. 1 illustrates a graph that compares the tumbling strength of green briquettes with the moisture content thereof, while FIG. 2 is a schematic representation of one embodiment of a non-agitated, perforate carrier having calcining and cooling zones, while FIG. 3 illustrates a cross-sectional view of one part of the perforate carrier through the calcining zone, along lines 3—3 of FIG. 2.

DESCRIPTION OF THE INVENTION AND THE PREFERRED EMBODIMENTS

In carrying out the present invention, a phosphate shale must be crushed so that at least 90 percent of the crushed shale is no larger than one-half inch, and desirably so that at least 80 percent of the crushed shale is no larger than one-fourth inch. Preferably, the shale is crushed so that all of it is substantially one-half inch or smaller. The phosphate shale treated by the present method normally contains about 22 to 32% $P_2O_5$ in the form of calcium phosphate along with silica, iron oxide and 2 to 4 percent of shale oil. Additionally, other organic matter and clay are present with small quantities of chromium oxide and vanadium oxide. Normally, the phosphate shale is crushed in a hammer mill into particulate form, although any conventional grinding means can be used which will crush the shale to the desired size.

The phosphate shale is all crushed to this fine size in order to break the phosphate oolites which are distributed throughout the shale. These phosphate oolites are particles of fluoroapatite $Ca_5(PO_4)_3F$ which are encased in a clay layer. By grinding all of the shale to this fine size, the phosphate oolites are broken, and the phosphate values are uniformly distributed throughout the ground shale. In the absence of grinding the shale fine enough to break these phosphate oolites, these oolites merely are distributed in a non-random fashion in the shale, causing irregular phosphate concentrations in the shale feed. This fine crushing step also eliminates any large phosphate particles having flat cleavage planes which are the weak structure in the shale particles, and which can result in disintegration of briquettes containing these large phosphate particles.

The phosphate shale, after crushing, is then formed into agglomerates having a size of about 1 ⅝ inches square, preferably by briquetting the crushed shale with water. In the briquetting operation the crushed shale is mixed with water and pressed into agglomerates using conventional briquetting equipment. During this briquetting operation it is essential that the final agglomerates, as discharged, have a moisture content of from about 9 to about 12 percent, and preferably about 10 to about 11.5 percent. This moisture content is essential if the green briquettes (briquettes prior to calcination) are to have the highest possible strength before being calcined. In general, the higher the green briquette strength, the higher will be the strength of the calcined briquette, under the same calcining conditions.

Figure 1:
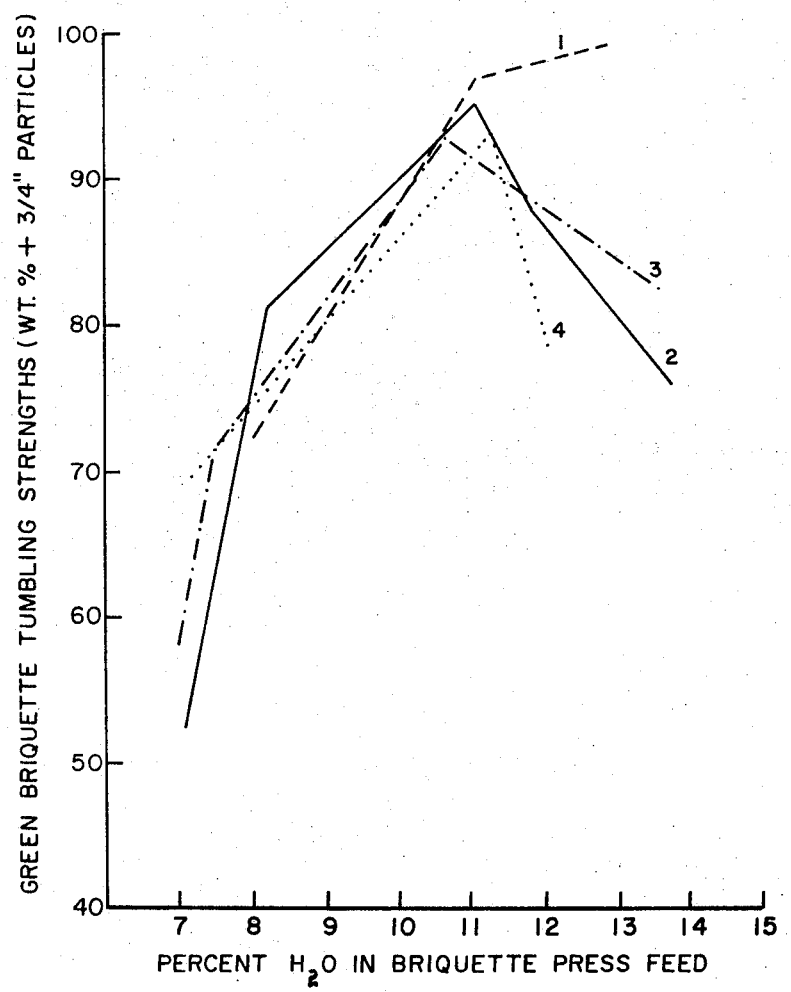

Comparative data showing the relation between green briquette tumbling strengths and percent water in the briquettes is set forth in FIG. 1 for four different feed sizes of ore to the briquetting presses. The four feed sizes of ore are set forth below as Runs Nos. 1 to 4.

| Screen Size | Shale Feed Size Run No. | | | |
|---|---|---|---|---|
| | 1 | 2 | 3 | 4 |
| +⅜ inch | 0 | 0 | 0 | 0 |
| +½ inch | 0 | 0.7 | 1.0 | 4.1 |
| +¼ inch | 0 | 10.0 | 1.7 | 14.3 |
| +6 mesh (U.S. standard) | 9.6 | 26.6 | 11.0 | 30.0 |
| +20 mesh (U.S. standard) | 27.9 | 40.6 | 28.9 | 42.9 |
| +100 mesh (U.S. standard) | 50.4 | 58.7 | 51.0 | 59.8 |
| +200 mesh (U.S. standard) | 61.0 | 67.1 | 61.5 | 68.1 |
| +325 mesh (U.S. standard) | 65.7 | 71.2 | 66.2 | 72.2 |

In FIG. 1 the green briquette tumbling strengths of the four runs are plotted as the ordinates, while percent water in the briquette press feeds are plotted as the abscissas. As will be seen from FIG. 1, green briquette tumbling strengths are obtained of at least 85 percent, where the percent water in the press feed is between 10 and 11.5, and of at least 80 percent when the percent water in the briquette press feed is between 9 and 12. The only exception to this is when the shale is all crushed to the commercially impractical limit where all of it is one-fourth inch or smaller. In that situation (Run 1) the water in the briquette press feed can go as high as 13 percent.

The green briquette tumbling strengths are calculated by tumbling samples of the green briquettes (about 15 briquettes) for one minute in a 14-inch diameter can 18 inches wide, equipped with one 2 ½-inch radial lifter. The tumbler is rotated on a central axis at a speed of 45 rpm. The green briquette tumble strengths are defined as the weight percent of the sample remaining which are three-fourths inch in diameter or larger.

Figure 2:
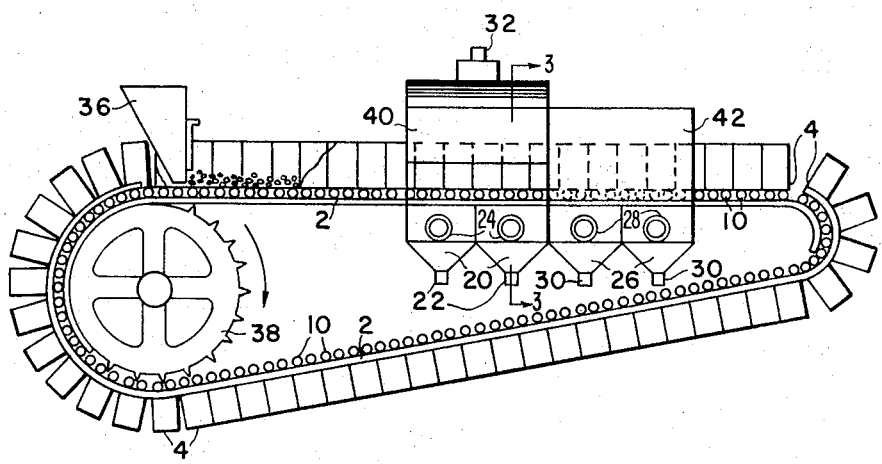

After formation of the briquettes containing the above-defined amounts of moisture, they are placed on a non-agitated, perforate carrier and calcined. A specific, non-agitated, perforate carrier which may be employed in the practice of the invention is illustrated by way of example in FIGS. 2 and 3.

Referring to these FIGURES, a continuous grate is made up of a plurality of pallets 4 forming an endless train and supported on rails 2. Phosphate briquettes are placed on top of the pallets 4 through hopper 36 to form a feed bed. The pallets may range in size from about 15 × 24 inches to about 3 × 8 feet. Metal side plates 6 bolted to the pallets 4 permit the grate to carry a phosphate bed of about 18 to 24 inches deep. The cast grate bars 8 are held in the bottom of the pallets by single pins 9, while the slots for the passage of gas between the grate bars 8 are about one-fourth inch wide. Each of the pallets is supported by four casters 10, two on each side. The casters 10 are attached to pick-up rods 12. A tooth sprocket 38 connects to a varidrive, engages the pick-up rods 12 and lifts the pallets to the top or forward track. The sprocket 38 imparts a pushing action on the pallet as it disengages from the sprocket, and this pallet in turn pushes the rest of the train. Normally, the pallets are not connected or hinged to each other. While the pallets are passing through the drying-calcining zone 40 and the cooling zone 42, a required gas seal is provided between the pallets and the wind boxes 20 and 26 and between side plates 6 and the hoods of drying-calcining zone 40 and cooling zone 42, as illustrated in section 3—3. The seal is provided by Teflon strips 16 in contact with the pallet steel plate 14 and by Teflon strips 34 in contact with the roof of the drying-calcining zone 40 and drying zone 42. The Teflon strips 16 are held in place by seal support plates 18 and by the walls of wind box 20. The Teflon strips 34 are held by metal pins against the metal side plates 6. Heat is supplied by passing a hot gas downward through opening 32 of the drying-calcining zone 40 and through the layer of briquettes on the grate bars 8. The gas then flows between the space of the grate bars 8 and into wind boxes 20. The main current of hot air is removed from duct 24 for reheating, while fines are removed from the lower vents 22.

When the heated briquettes pass into the cooling zone 42, ambient air is forced downwardly through the phosphate bed and through grate bars 8 into wind boxes 26. The main current of cooling air is expelled through duct 28 for recycle to the calcining hood, while fines are removed through lower vents 30.

The endless grate carries the feed bed of phosphate briquettes slowly through the drying and calcining section, and then finally into the cooling section. The speed of the grate is regulated so that the retention time during the calcining operation is at least about 15 minutes and preferably between about 15 to about 25 minutes. During this step hot gases at a temperature of from about 2,000°F. to about 2,500°F. are passed downwardly through the feed bed in the drying and calcining zone at a rate of about 0.43 to about 0.53 lb. mole/min./ft.$^2$ of grate.

It is preferred that the hot gases used in the calcining zone contain oxygen in order to burn any shale oil contained in the feed and thereby reduce the heating requirements of the calciner. Non-oxygen containing gases may be employed for heating but are not as desirable, since these merely vaporize any shale oil without burning it. These hot gases raise the temperature of the phosphate briquettes to the temperature required for complete calcination. The temperature of the phosphate briquettes may exceed slightly the temperature of the hot gases because combustion of any shale oil within the bed contributes its heat to the calciner.

The calcined phosphate is cooled in the cooling zone by forcing ambient air downwardly through the bed so that the average temperature of the product is low enough to permit it to be handled on rubber conveyors. Generally, this temperature is about 250–450°F. After passing through the cooling section, the calcined phosphate product is spilled and recovered. The air used in cooling the bed, which is now at a substantially higher temperature, normally is recycled to the calcining hood for additional heating and is used as part of the heating gas in the calcining zone.

The resultant calcined phosphate product comprises a suitable furnace feed which has been freed of volatiles such as shale oil, $CO_2$, $H_2O$, and the like. The calcination results in lowering the original weight of the phosphate ore by about 5 to 10 percent, but leaves the other ingredients substantially unchanged. Most importantly, the resulting phosphate product has its phosphorous values uniformly distributed.

The calcination of a briquette made up of finely ground phosphate shale and which contains a critical amount of moisture, on a non-agitated perforate carrier, results in obtaining a calcined phosphate furnace feed having an unexpected increase in strength, expressed as calcined tumbling strengths, coupled with extremely small amounts of fines in the calcined product. The calcined tumbling strengths are established by tumbling samples (about 500 g.) of the calcined product for 10 minutes in a 14-inch diameter can, 18 inches wide, equipped with one 2 ½-inch radial lifter. The tumbler is rotated on a central axis at a speed of 45 rpm. Calcined tumbling strength is defined as the percent of the sample remaining on a 6 mesh screen after tumbling. This test is designed to show the physical strengths of the calcined product.

The calcined product obtained by the instant process is superior to that obtained from rotary kilns and to calcined briquettes obtained from processes in which briquettes are calcined on an underhearth layer of shale lump, as described in U. S. Pat. No. 3,076,248. The present process has the advantage of having regular spacing between the uniform briquettes throughout the entire feed bed, whereas the irregular sizing of shale lump, normally used in underhearth layers of the above patented process precludes even spacing. The regular spacing permits pulling increased drafts through the bed and yields better calcination at lower temperatures and in shorter periods.

Fewer fines appear to be generated during calcination of the instant briquettes than are obtained during calcination of shale lump in the above patented process. The decrease in fines obtained by the present process permits uniform drafts to be pulled through the bed in both the calcining and cooling zones, and the lack of fines permits the wind boxes to operate freely without reduced efficiencies due to gradual plugging.

An advantage of the present process over conventional rotary kilns is the more efficient utilization of heat derived from the combustion of shale oil which is present in the phosphate shale feed. In rotary kiln calcination, this shale oil does not contribute a significant amount of heat because it burns in the gas stream over the bed of calcining material. In the present process the heat from the combustibles is liberated progressively from the top to the bottom of the bed and thereby is effectively used for heating lower portions of the bed. Because the combustion heat is released in intimate contact with the bed, the heat can be effectively absorbed in the lower section of the bed, and temperature penetration downward into the bed is faster than if all the heat is applied by the inlet calcining gas. As a result, a lower inlet gas heat input and temperature are required which reduce fuel costs for operating the calciner.

Another advantage which is obtained by using the present calcining process is the elimination of a low temperature drying period for the green briquette feed. In the normal rotating kiln process, a drying period of approximately 6 minutes is required to dry out the green briquettes before calcining. This is necessary to prevent the green agglomerates from spalling or degrading into fines upon shock heating at calcining temperatures. The elimination of the drying period does not seriously reduce the average calcined tumbling strength of the product when a calcining time of about 15 to about 25 minutes is used in the non-agitated, perforate, carrier-type calciner.

Another unexpected advantage is that briquettes containing shale concentrates can be calcined by the present process but cannot be efficiently calcined in rotary kilns. Shale concentrates are formed by crushing a low grade ore containing small amounts of phosphate embedded in the shale. The crushed product is then treated to a flotation step and the phosphate nodules are separated from the residual shale. These phosphate concentrates are then treated to a pelletizing or briquetting operation using water as the binder. These briquettes, containing phosphate concentrates, are then calcined and used as phosphate furnace feeds.

The use of shale concentrates is necessary in the foreseeable future in order to beneficiate the phosphate ores, to reduce mining cost and to extend phosphate reserves. In the pilot tests that were conducted in the field, it was found that briquettes containing concentrates cannot be efficiently calcined in rotary kilns even if the briquettes are partially dried before calcination.

The present process, by contrast, successfully calcines these shale concentrate-containing briquettes without even requiring a partial drying operation. Furthermore, the use of concentrates in the briquettes does not change the requirements of the grate area of the calciner.

The following examples are given to illustrate the present invention and are not deemed to be limiting thereof.

EXAMPLE 1

A continuous grate calciner of the type illustrated in FIG. 1, and having pallets 15 inches wide and 2 feet long, was employed to calcine 18-inch beds of phosphate briquettes. The phosphate briquettes used in making up the beds were formed by introducing water and crushed phosphate shale into a briquetting apparatus. The crushed phosphate briquette feed had the following size distribution:

| Screen | Size (Percent on screen) |
|---|---|
| +1 inch | 0.4 |
| +¾ inch | 2.0 |
| +½ inch | 9.0 |
| +¼ inch | 20.9 |
| +6 mesh (U. S. standard) | 30.0 |
| +20 mesh (U. S. standard) | 41.3 |
| +48 mesh (U. S. standard) | 49.5 |
| +100 mesh (U. S. standard) | 58.3 |
| +200 mesh (U. S. standard) | 68.2 |
| +325 mesh (U. S. standard) | 73.1 |

Three samples of the crushed phosphate briquette feed were mixed with the amounts of water set forth in Table I. Thereafter the "green briquette tumbling strength" of these briquettes (prior to calcination) was obtained by determining the percent of +¾-inch pieces remaining after tumbling 15 green briquettes for 1 minute. The results are reported in Table I corresponding to the water content of the green briquettes.

The green briquettes were then calcined at a temperature of 2,260°F. for about 22 minutes with a gas velocity in the calcining zone of 0.47 lb. mole/min./ft.$^2$ of grate in each case. The "calcined tumbling strength" of the briquettes (after calcination) was determined by measuring the percent of +6 mesh pieces remaining after tumbling 5 calcined briquettes for 10 minutes. This was found to be above 85% in all cases.

TABLE I

| H$_2$O in Briquette Feed | Green Briquette Tumbling Strength |
|---|---|
| 11.0% | 94.4% |
| 12.5% | 92.7% |
| 12.8% | 85.5% |

EXAMPLE 2

A continuous grate calciner of the type illustrated in FIG. 1, and having pallets 15 inches wide and 2 feet long, was employed to calcine 18-inch beds of phosphate briquettes. The phosphate briquettes used in making up the beds were formed by briquetting crushed phosphate shale fractions with varying amounts of water in a briquette feed mixture, as set forth in Table II. The briquettes were calcined at a temperature of 2,260°F. for about 22 minutes with a gas velocity in the calcining zone of 0.47 lb. mole/min./ft.$^2$ of grate in each case. The green briquette tumbling strength of the briquettes (prior to calcination) and the calcined tumbling strength of the briquettes (after calcination) is also set forth in Table II. Substantially uniform phosphorous analyses were obtained from representative briquette samples throughout the bed. In furnace operations the briquettes gave a steady, uniform reaction with added carbon, resulting in excellent furnace stabilization.

TABLE II

| Test Run | Shale Size in Briquette Feed | H$_2$O in briquette Feed | Green[1] briquette Tumbling Strength | calcined[2] Tumbling Strength |
|---|---|---|---|---|
| 1 | 100% –½ inch | 9.8% | 97.8 | 88.4 |
| 2 | 95% –½ inch 5% +½ inch | 10.1% | 96.7 | 83.6 |
| 3 | 90% –½ inch 10% –¾ in. +½ in. | 8.9% | 95.5 | 81.4 |
| 4 | 90% –½ inch 10% –1 in. +¾ in. | 8.8% | 91.5 | 85.2 |
| 5 | 90% –½ inch 10% –1 ½ in. +1 in. | 9.9% | 91.5 | 85.0 |
| 6 | 90% –½ inch 10% –2 in. +1 ½ | 10.7% | 88.9 | 86.2 |

[1] Percent of +¾-inch pieces remaining after tumbling 15 green briquettes for one minute
[2] Percent of +6 mesh pieces remaining after tumbling 5 calcined briquettes for ten minutes

EXAMPLE 3

Run A - Phosphate shale was crushed to 100 percent –½ inch with at least 80 percent being –¼ inch, and the crushed shale was mixed with water. The shale-water mixture, containing from 9.8 to 10.7% of water, was briquetted, and the briquettes were formed into 18-inch deep beds on a continuous grate calciner of the type illustrated in FIG. 1 and described in Example 2. The briquettes in the bed were calcined at a temperature of 2,260°F. for about 20 minutes with a gas velocity in the calcining zone of 0.47 lb. mole/min./ft.$^2$ of grate. The calcined tumbling strengths of the resulting briquettes at various depths in the bed were determined and are reported in Table III. Substantially uniform phosphorous analyses were obtained from representative briquette samples throughout the bed.

Run B - The procedure of Run A was repeated using shale from the same source except that a crushed phosphate shale lump fraction, having a particle size up to 3 inches in diameter, was used as a 4-inch deep underhearth layer. The briquettes were placed on top of the underhearth layer to form a total bed 18 inches deep. The calcined tumbling strengths of the resulting briquettes at various depths in the bed were determined and are reported in Table III. The phosphorous analyses of the calcined lump fraction were not uniform, and varied from that of the briquettes.

TABLE III

TUMBLING STRENGTHS[1]

| | Top of Bed | Middle of Bed | Bottom of Briquette Bed | Avg. |
|---|---|---|---|---|
| Run A | 90.7 | 87.6 | 73.6 | 83.9 |
| Run B | 88.5 | 81.7 | 72.6 | 80.8 |

[1] Percent of +6 mesh pieces remaining after tumbling 5 calcined briquettes for ten minutes

EXAMPLE 4

The procedure of Example 3 was repeated using only briquettes in Run A, and employing a 4-inch underhearth of phosphate lump with an overlay of briquettes in Run B. The calcined product of both Run A and Run B were screened, and the size distribution of the calcined particles was determined. This size distribution is set forth below in Table IV.

TABLE IV

Size Distribution of Calcined Product (Wt. %)

|  | +1 inch | +¾ inch | +½ inch | +¼ inch | +6 mesh |
|---|---|---|---|---|---|
| Run A | 86.5 | 90.5 | 95.0 | 97.5 | 98 |
| Run B | 70.0 | 81.0 | 89.5 | 94 | 96 |

The results of Example 3 and 4 clearly show that the instant calcined product (as set forth in Run A of the Examples) is both larger in average size and stronger than that produced under identical conditions, except for the use of a phosphate lump underhearth layer (Run B of the Examples). Further, Table IV illustrates that the instant process (Run A) yields a product having 86.5 wt. % greater than 1 inch. When this process is duplicated with the same briquette feed, but with an underhearth layer of phosphate lump, the calcined product has only 70.0 wt. % greater than 1 inch (Run B). This shows the desirability of calcining the instant, specially prepared green briquettes, without a conventional underhearth layer such as is commonly used in prior processes.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. The method of producing calcined phosphate agglomerates having high structural strength and uniform phosphorous values which comprises, crushing a western phosphate shale ore containing minor amounts of shale oil so that at least 90 percent is minus 1/2 inch and at least 2.7% is plus one-fourth inch, briquetting all of the crushed ore with sufficient water to obtain green agglomerates having a moisture content of about 10 to about 11.5 weight percent, placing said green agglomerates on a non-agitated grate to form a homogeneous bed of said green agglomerates, passing said bed of green briquettes containing said moisture directly through a calcining zone, passing a heated gas through said bed in said calcining zone and heating said green agglomerates to temperatures of from about 2,000 to 2,500°F., maintaining said bed in said calcining zone for at least about 15 minutes, passing the resulting calcined bed into a cooling zone to cool said calcined bed, and recovering calcined phosphate agglomerates from said non-agitated grate.

2. Process of claim 1 wherein said phosphate ore is crushed so that at least 95 percent is no larger than one-half inch, with at least 80 percent being no larger than one-fourth inch.

3. Process of claim 1 wherein said bed is calcined for from 15 to 25 minutes.

4. Process of claim 1 wherein said phosphate ore is a shale and contains about 2 to about 4 percent shale oil.

5. Process of claim 1 wherein said heated gas contains oxygen and is passed through said bed at a rate of from about 0.43 to about 0.53 lb. mole/min./ft.$^2$ of grate area.

* * * * *